United States Patent
Elliott et al.

(10) Patent No.: US 9,533,565 B2
(45) Date of Patent: Jan. 3, 2017

(54) ACTIVE GRILLE SHUTTER ASSEMBLY

(71) Applicant: Montaplast of North America, Inc., Auburn Hills, MI (US)

(72) Inventors: Jeffrey Elliott, Novi, MI (US); Sascha Klausen, Waterford, MI (US); Andrew Kowalski, Waterford, MI (US)

(73) Assignee: Montaplast of North America, Inc., Auburn Hills, MI (US)

( * ) Notice: Subject to any disclaimer, the term of this patent is extended or adjusted under 35 U.S.C. 154(b) by 0 days.

(21) Appl. No.: 14/171,832

(22) Filed: Feb. 4, 2014

(65) Prior Publication Data

US 2014/0216834 A1    Aug. 7, 2014

Related U.S. Application Data

(60) Provisional application No. 61/760,828, filed on Feb. 5, 2013.

(51) Int. Cl.
B60K 11/08    (2006.01)

(52) U.S. Cl.
CPC .................................. B60K 11/085 (2013.01)

(58) Field of Classification Search
CPC .................................................... B60K 11/085
USPC ................. 180/68.4, 68.1; 123/41.04, 41.05
See application file for complete search history.

(56) References Cited

U.S. PATENT DOCUMENTS

| | | | | |
|---|---|---|---|---|
| 1,443,978 A * | 2/1923 | Carter | ...................... | F01P 7/12 |
| | | | | 123/41.05 |
| 1,501,933 A * | 7/1924 | Wilson | ................. | B60K 11/085 |
| | | | | 236/35.3 |
| 1,523,541 A * | 1/1925 | Irving | .................. | B60K 11/085 |
| | | | | 123/41.04 |
| 1,542,407 A * | 6/1925 | Raleigh | ................ | B60K 11/085 |
| | | | | 123/41.04 |
| 1,576,507 A * | 3/1926 | Eliasek | ................ | B60K 11/085 |
| | | | | 123/41.04 |
| 1,619,621 A * | 3/1927 | Lovejoy | ............... | B60K 11/085 |
| | | | | 123/41.05 |
| 1,772,722 A * | 8/1930 | Kinnard | ..................... | F01P 7/12 |
| | | | | 123/41.05 |
| 3,115,223 A * | 12/1963 | Shustrom | ............. | B60K 11/085 |
| | | | | 160/236 |
| 3,759,056 A * | 9/1973 | Graber | ................. | B60H 1/3227 |
| | | | | 165/271 |
| 4,457,558 A * | 7/1984 | Ishikawa | .............. | B62D 35/005 |
| | | | | 123/41.05 |
| 6,508,506 B2 * | 1/2003 | Ozawa | .................... | B60K 11/04 |
| | | | | 293/113 |
| 7,044,517 B2 * | 5/2006 | Hyuga | ....................... | 296/193.1 |
| 7,374,220 B2 * | 5/2008 | Ichimaru | .................. | B60R 7/06 |
| | | | | 296/24.34 |

(Continued)

*Primary Examiner* — J. Allen Shriver, II
*Assistant Examiner* — Brian Cassidy
(74) *Attorney, Agent, or Firm* — Howard & Howard Atorneys PLLC

(57) ABSTRACT

An active grille shutter assembly includes a frame adapted to be connected to a portion of a vehicle and forming at least one opening therein and a plurality of shutters disposed in and extending across the at least one opening and being pivotally connected to the frame. The active grille shutter assembly also includes at least one linkage connected to the shutters and an actuator supported by the frame and being connected to one of the shutters to move the at least one linkage to open and close the shutters as a unit.

3 Claims, 5 Drawing Sheets

(56) References Cited

U.S. PATENT DOCUMENTS

| | | | |
|---|---|---|---|
| 7,887,125 B2* | 2/2011 | Tazaki et al. | 296/193.1 |
| 7,942,223 B2* | 5/2011 | Obayashi | B60K 11/04 |
| | | | 180/68.1 |
| 8,136,487 B2* | 3/2012 | Bernt | B60K 11/085 |
| | | | 123/41.05 |
| 8,505,660 B2 | 8/2013 | Fenchak et al. | |
| 8,561,739 B2* | 10/2013 | Hori | B60K 11/085 |
| | | | 180/68.1 |
| 8,640,802 B2* | 2/2014 | Schneider | B60K 11/085 |
| | | | 123/41.04 |
| 8,646,552 B2* | 2/2014 | Evans | B60K 11/085 |
| | | | 180/68.1 |
| 8,827,233 B2* | 9/2014 | Crane | F24F 13/20 |
| | | | 248/200 |
| 9,233,605 B2* | 1/2016 | Hijikata | B60K 11/085 |
| 2009/0266633 A1* | 10/2009 | Obayashi | B60K 11/04 |
| | | | 180/68.4 |
| 2009/0266634 A1* | 10/2009 | Obayashi | B60K 11/04 |
| | | | 180/68.4 |
| 2010/0236503 A1* | 9/2010 | Bernt et al. | 123/41.05 |
| 2010/0243352 A1 | 9/2010 | Watanabe et al. | |
| 2011/0226541 A1 | 9/2011 | Hori et al. | |
| 2011/0232981 A1 | 9/2011 | Hori et al. | |
| 2012/0012410 A1 | 1/2012 | Hori | |
| 2012/0019025 A1* | 1/2012 | Evans | B60K 11/085 |
| | | | 296/193.1 |
| 2012/0060776 A1* | 3/2012 | Charnesky et al. | 123/41.05 |
| 2012/0074729 A1* | 3/2012 | Fenchak | B60K 11/085 |
| | | | 296/193.1 |
| 2012/0119059 A1* | 5/2012 | Crane et al. | 248/674 |
| 2012/0270490 A1* | 10/2012 | Turner et al. | 454/75 |
| 2012/0312611 A1* | 12/2012 | Van Buren et al. | 180/68.1 |
| 2013/0001454 A1* | 1/2013 | Schwarz et al. | 251/304 |
| 2013/0025952 A1 | 1/2013 | Kitashiba et al. | |
| 2013/0036991 A1* | 2/2013 | Kerns | F01P 7/10 |
| | | | 123/41.04 |
| 2013/0068403 A1 | 3/2013 | Fenchak et al. | |
| 2013/0075172 A1 | 3/2013 | Hori | |
| 2013/0092463 A1 | 4/2013 | Hori | |
| 2013/0095740 A1 | 4/2013 | Hori | |
| 2013/0103265 A1* | 4/2013 | Remy et al. | 701/49 |
| 2013/0126253 A1 | 5/2013 | Saito et al. | |
| 2013/0146375 A1* | 6/2013 | Lee | 180/68.1 |
| 2013/0223980 A1 | 8/2013 | Pastrick et al. | |
| 2013/0247862 A1 | 9/2013 | Sakai | |
| 2013/0252531 A1 | 9/2013 | Asano et al. | |
| 2013/0268164 A1 | 10/2013 | Sugiyama | |
| 2013/0275009 A1 | 10/2013 | Sakai | |
| 2013/0284401 A1* | 10/2013 | Kiener et al. | 165/98 |
| 2014/0090610 A1* | 4/2014 | Higuchi | B60K 11/085 |
| | | | 123/41.58 |
| 2014/0094104 A1* | 4/2014 | Manhire et al. | 454/152 |
| 2014/0170960 A1 | 6/2014 | Vacca | 454/333 |
| 2014/0174220 A1 | 6/2014 | Jeong et al. | 74/89.14 |
| 2014/0194052 A1* | 7/2014 | Asano | B60K 11/08 |
| | | | 454/335 |
| 2014/0196965 A1* | 7/2014 | Platto | B60K 11/085 |
| | | | 180/68.1 |
| 2014/0299077 A1* | 10/2014 | Sowards | F01P 7/10 |
| | | | 123/41.05 |
| 2015/0231962 A1* | 8/2015 | Ruppert | B60K 11/085 |
| | | | 180/68.1 |

* cited by examiner

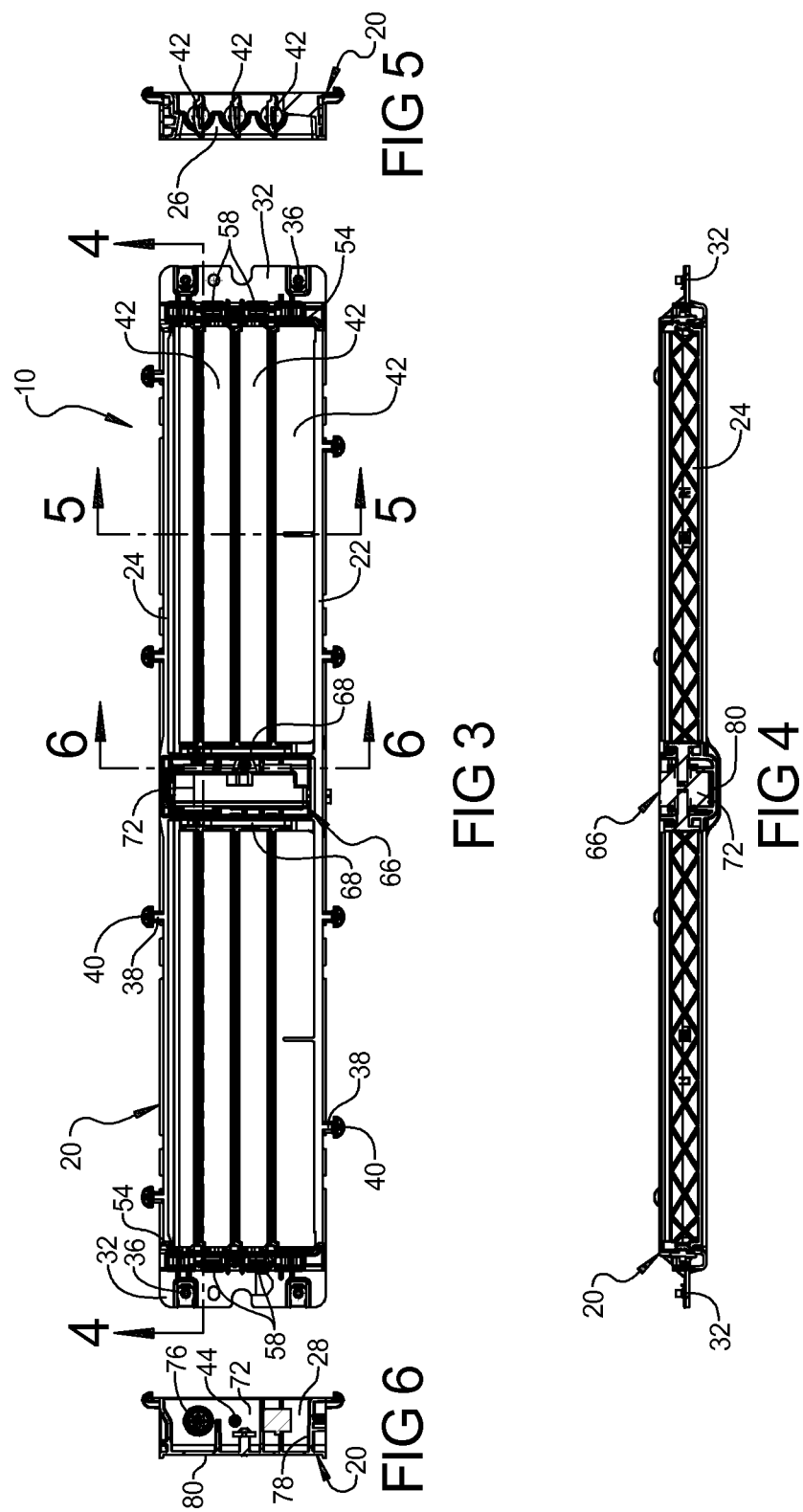

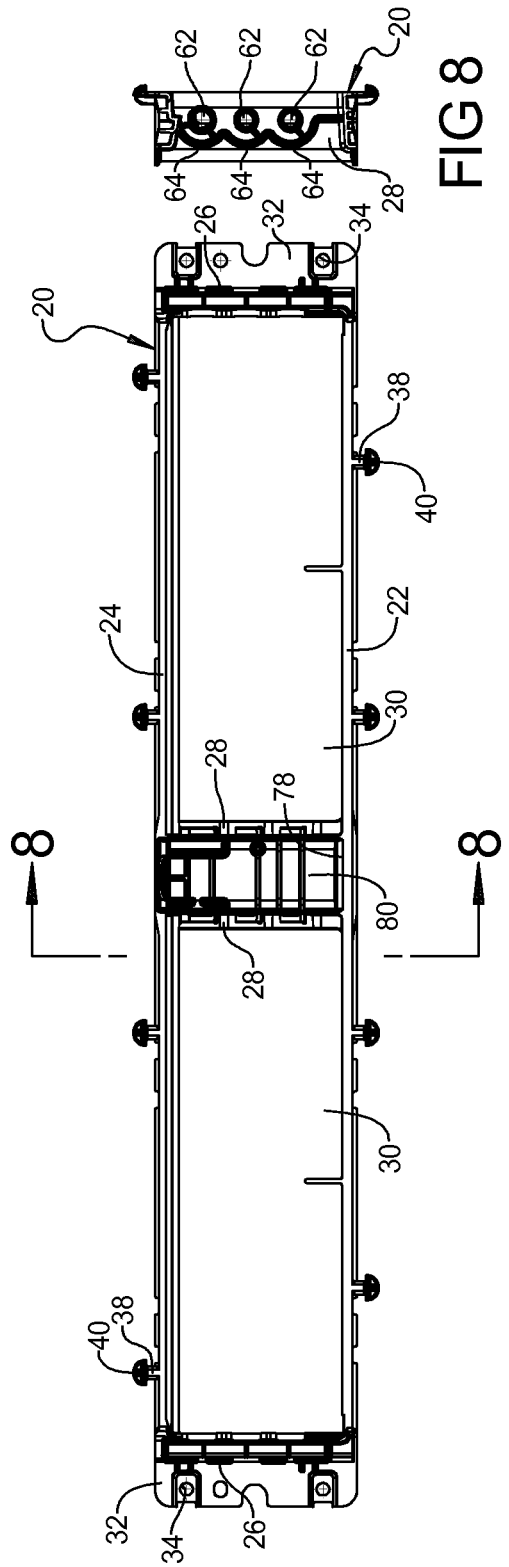

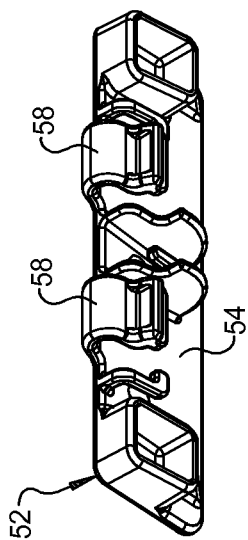
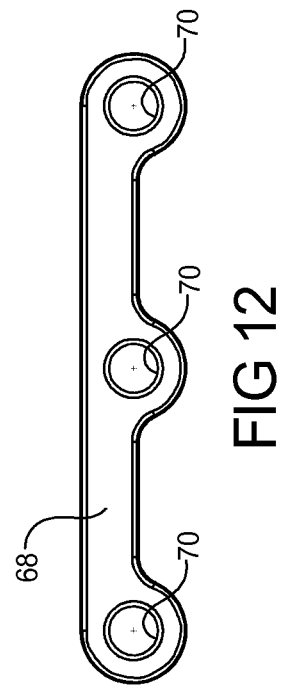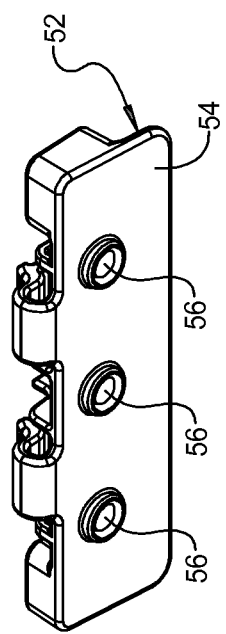
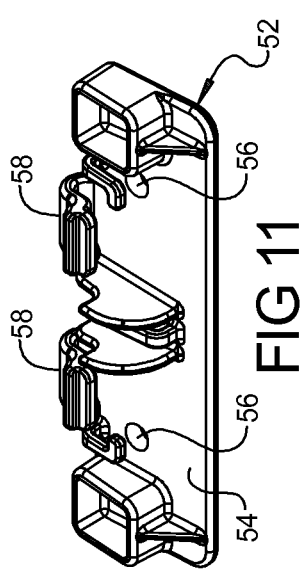

ACTIVE GRILLE SHUTTER ASSEMBLY

CROSS-REFERENCE TO RELATED APPLICATION(S)

The present invention claims the priority date of U.S. Provisional Patent Application Ser. No. 61/760,828, filed Feb. 5, 2013.

BACKGROUND OF THE INVENTION

1. Field of the Invention

The present invention relates generally to shutter assemblies for vehicles and, more specifically, to an active grille shutter assembly for a vehicle.

2. Description of the Related Art

Grille shutters are provided for a vehicle in order to prevent poor combustion or a decrease in a combustion efficiency caused by an overcooled radiator within an engine compartment of the vehicle. Conventional grille shutters include a grille opening through which ambient air is taken in and a plurality of shutters or fins disposed in the grille opening to be opened or closed. For example, such a grille shutter includes a supporting shaft which supports a plurality of fins and is provided at a base frame so as to be freely rotatable in such a way that the fins are connected to each other by an interlocking arm. The interlocking arm is connected to a link mechanism that is configured by a driving arm rotated by a driving source such as an actuator in order to operate the fins so as to open or close the grille opening.

One disadvantage of these conventional grille shutters is that they have a link mechanism that is complex and exposed to debris and environmental contaminants. In addition, these conventional grille shutters require flexibility of the fins to bend and fit in the frame, resulting in rattles from necessary running clearances required for temperature range requirements. Therefore, there is a need in the art for a new grille shutter assembly that is more durable and resists rattling.

SUMMARY OF THE INVENTION

The present invention overcomes the disadvantages in the related art in an active grille shutter assembly including a frame adapted to be connected to a portion of a vehicle and forming at least one opening therein and a plurality of shutters disposed in and extending across the at least one opening and being pivotally connected to the frame. The active grille shutter assembly also includes at least one linkage connected to the shutters and an actuator supported by the frame and being connected to one of the shutters to move the at least one linkage to open and close the shutters as a unit.

In this way, the active grille shutter assembly of the present invention solves this issue by eliminating or greatly reducing rattles from necessary running clearances required for temperature range requirements. In addition, the active grille shutter assembly of the present invention improves design and manufacture efficiency. Further, the active grille shutter assembly of the present invention has an actuator that is located and retained in a unique way. The active grille shutter assembly of the present invention has a shutter linkage that is greatly simplified and fully protected from debris and environmental contaminants. The active grille shutter assembly of the present invention has an anti-rattle feature incorporated in bearing end caps that improves auditory quality of the assembly. The active grille shutter assembly of the present invention has bearing end caps that simplify tooling while allowing increased performance and reducing total cost of the assembly.

Other objects, features, and advantages of the present invention will be readily appreciated as the same becomes better understood after reading the subsequent description taken in connection with the accompanying drawings.

BRIEF DESCRIPTION OF THE DRAWINGS

FIG. 3 is an elevational view of the active grille shutter assembly, according to one embodiment of the present invention.

FIG. 4 is a sectional view taken along line 4-4 of FIG. 3.

FIG. 5 is a sectional view taken along line 5-5 of FIG. 3.

FIG. 6 is a sectional view taken along line 6-6 of FIG. 3.

FIG. 7 is an elevational view of the active grille shutter assembly, according to one embodiment of the present invention, prior to assembly.

FIG. 8 is a sectional view taken along line 8-8 of FIG. 7.

FIG. 9 is a first perspective view of an end support for the active grille shutter assembly of FIGS. 1 through 3.

FIG. 10 is a second perspective view of an end support for the active grille shutter assembly of FIGS. 1 through 3.

FIG. 11 is a third perspective view of an end support for the active grille shutter assembly of FIGS. 1 through 3.

FIG. 12 is an elevational view of a linkage for the active grille shutter assembly of FIGS. 1 through 3.

DETAILED DESCRIPTION OF THE PREFERRED EMBODIMENT(S)

Figure 1:
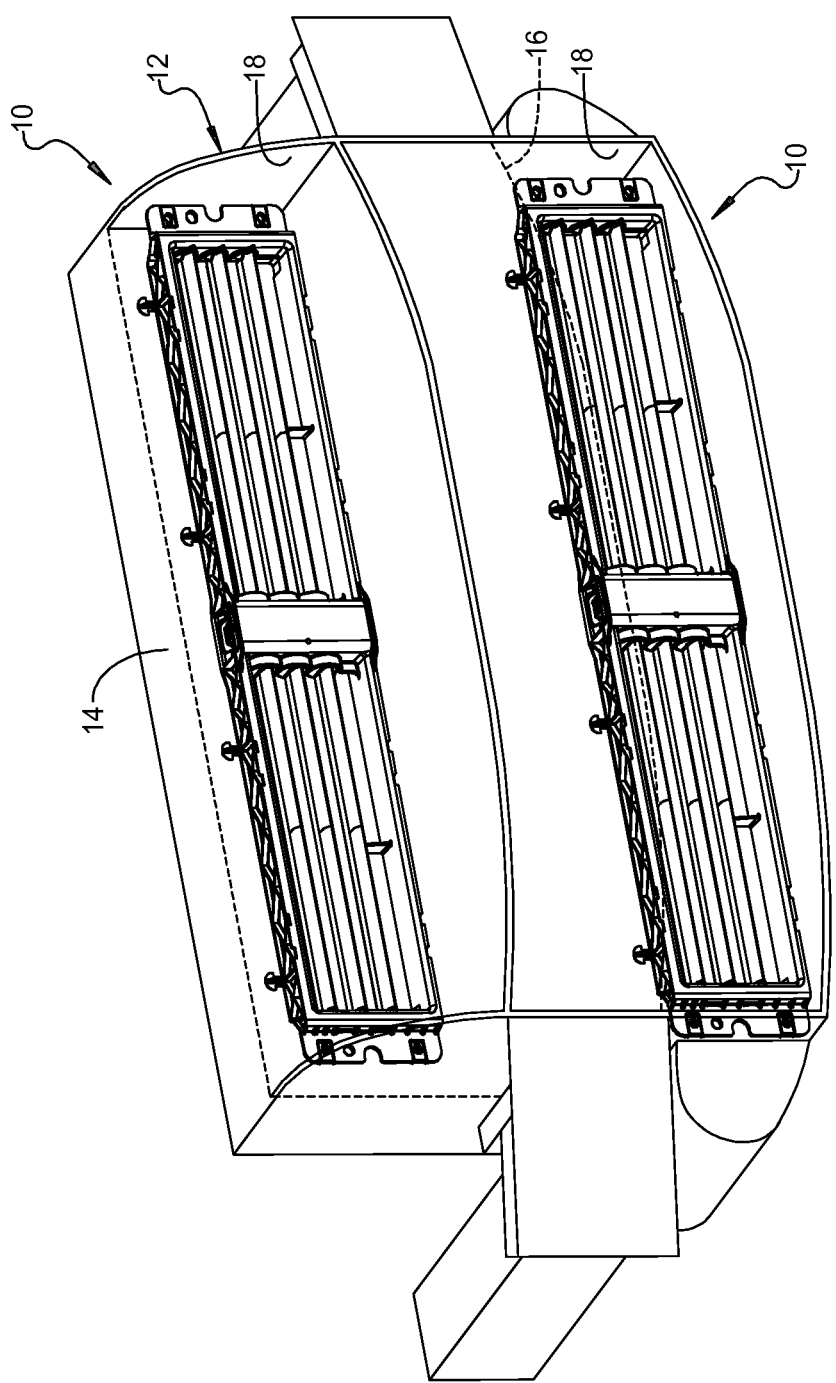
FIG. 1 is a perspective view of an active grille shutter assembly, according to one embodiment of the present invention, illustrated in operational relationship with a vehicle.
Figure 2:
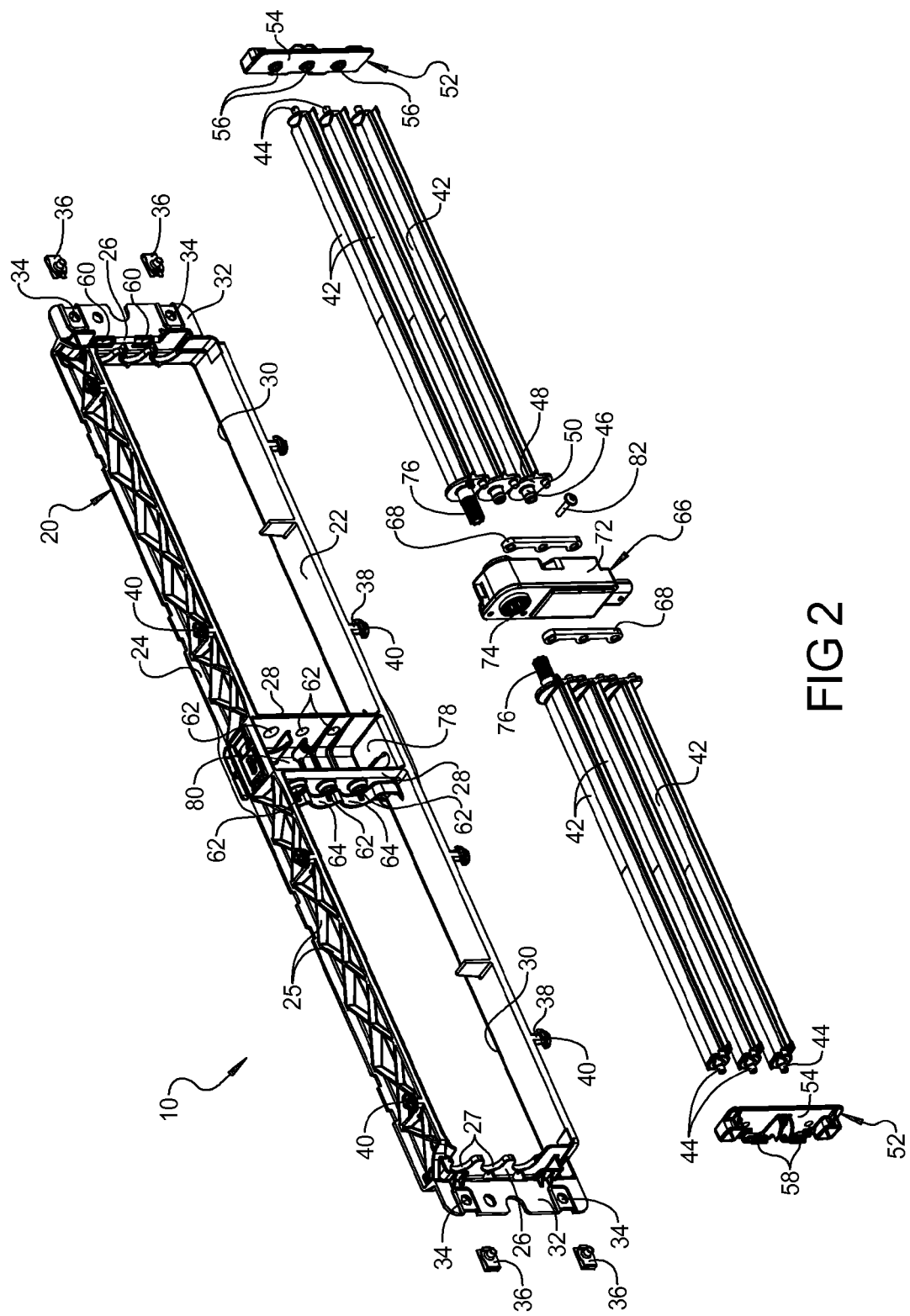
FIG. 2 is an exploded perspective view of the active grille shutter assembly, according to one embodiment of the present invention.

Referring now to the figures, where like numerals are used to designate like structure, one embodiment of an active grille shutter assembly, according to the present invention, is illustrated at 10 in FIG. 1. The active grille shutter assembly 10 is used in connection with a vehicle, generally indicated at 12. As illustrated, the vehicle 12 includes a radiator 14 mounted to a frame 16 within an engine compartment of the vehicle 12. The frame 16 has at least one, preferably upper and lower openings 18 to allow ambient air to be taken in and cool the radiator 14. In one embodiment, one active grille shutter assembly 10 is disposed in each of the openings 18 to control the amount of airflow through the openings 18 to the radiator 14. It should be appreciated that the vehicle 12 is conventional and does not form a part of the present invention, which is directed to the active griller shutter assembly 10.

Referring to FIGS. 1 through 8, the active grille shutter assembly 10 is used to control airflow into the radiator 14 in the engine compartment of the vehicle 12. In the representative example illustrated herein, the active grille shutter assembly 10 includes a frame, generally indicated at 20, for connection to the frame 16 of the vehicle 12. The frame 20 is generally rectangular in shape. The frame 20 includes a bottom wall 22 extending laterally, a top wall 24 extending laterally and opposing the bottom wall 22, and side walls 26 extending between and perpendicular to the bottom wall 22 and top wall 24 at the lateral ends thereof. The bottom wall 22 and top wall 24 have truss members 25 with a generally "X" shape extending outwardly on an exterior surface thereof. The side walls 25 include a plurality of arcuate recesses 27 extending therein. The frame 20 also includes a pair of interior walls 28 laterally spaced and extending between the bottom wall 22 and top wall 24. Each interior wall 28 cooperates with one side wall 26, the top wall 24, and bottom wall 22 to form an opening 30 for air to pass therethrough. The opening 30 is generally rectangular in shape. The frame 20 further includes an end flange 32 extending perpendicularly from each side wall 26. Each end flange 32 has at least one, preferably a plurality of apertures 34 extending therethrough and at least one clip 36, preferably a clip 36 to cooperate with each aperture 34 to receive a fastener (not shown) for attaching the frame 20 to the frame 16 of the vehicle 12. The frame 20 further includes at least one, preferably a plurality of projections 38 to be disposed in corresponding apertures (not shown) of the frame 16 of the vehicle 12. The projections 38 extend vertically and are spaced laterally along the bottom wall 22 and top wall 24 of the frame 20. The projections 38 have an enlarged head 40 at a free end thereof to be disposed in corresponding apertures in the frame 16 of the vehicle 12 to restrain the frame 20 from movement. The projections 38 are insert molded to the frame 20 and are integral and one-piece with the frame 20. The frame 20 is made of a rigid material such as plastic. The frame 20 is injection molded and is formed integral, unitary, and one-piece.

The active grille shutter assembly 10 also includes at least one, preferably a plurality of louvers or shutters 42 disposed in each opening 30 to control the amount of airflow through each opening 30. The shutters 42 are generally rectangular in shape. The shutters 42 extend laterally and have a vertical height sufficient to close the opening 30. In the embodiment illustrated, there are three (3) shutters 42 for each opening 30. The shutters 42 are spaced vertically and extend laterally along the frame 20. The shutters 42 have a first shaft 44 at one end extending axially and a second shaft 46 at the other end extending axially. The second shaft 46 has a diameter greater than the first shaft 44. The shutters 42 also have a flange 48 extending radially outwardly at the end thereof adjacent a base of the second shaft 46. The shutters 42 includes a projection 50 extending axially from the flange 48 and spaced radially from the second shaft 46. The shutters 42 are made of a rigid material such as plastic. The shutters 42 are injection molded and each one is formed integral, unitary, and one-piece.

The active grille shutter assembly 10 further includes at least one, preferably a plurality of bearing end caps or members, generally indicated at 52, supported on the frame 20. The end members 52 are generally rectangular in shape. Each end member 52 has a base wall 54 extending vertically. The base wall 54 has at least one, preferably a plurality of apertures 56 extending therethrough to receive the first shaft 44 of the shutters 42. Each end support 52 also has an attachment tab or flange 58 extending from the base wall 54. The attachment flange 58 is generally "C" shaped. Each end member 52 is disposed on the frame 20 at each lateral end thereof and a portion of the attachment flange 58 is disposed in corresponding apertures 60 in the side walls 26 of the frame 20. The end members 52 are used to support one end of the shutters 42 in the opening 30 on the frame 20. The end members 52 are made of a rigid material such as plastic. The end members 52 are injection molded and each one is formed integral, unitary, and one-piece. It should be appreciated that the attachment flanges 58 act like springs to allow the end members 52 to move back and forth in a temperature range between approximately −40° F. to approximately 105° F.

The active grille shutter assembly 10 includes at least one, preferably a plurality of apertures 62 spaced vertically and extending axially through the interior walls 28 of the frame 20 to receive the second shaft 46 of the shutters 42. The active grille shutter assembly 10 also includes at least one, preferably a plurality of flanges 64 spaced vertically and extending axially into the openings 30 and about a portion of the apertures 62. As illustrated, the flanges 64 have an arcuate shape and receive the flanges 46 of the shutters 42. The flanges 64 are integral, unitary, and one-piece with the interior walls 28.

The active grille shutter assembly 10 also includes an actuator assembly, generally indicated at 66, to actuate the shutters 42 to move the shutters 42 between a fully closed position and a fully opened position. The actuator assembly 66 includes at least one, preferably a plurality of linkages 68 to interconnect the shutters 42 such that they move as a unit. Each linkage 68 is generally rectangular in shape and has at least one, preferably a plurality of apertures 70 extending therethrough. As illustrated, the apertures 70 are spaced such that one aperture 70 receives one projection 50 of one shutter 42. One linkage 68 is used for the shutters 42 on each opening 30 of the frame 20. The linkages 68 are spaced laterally along the interior walls 28 of the frame 20. The linkages 68 are made of a rigid material such as plastic. The linkages 68 are integral, unitary, and one-piece. It should be appreciated that the flanges 64 protect the linkages 68 from debris.

The actuator assembly 66 further includes at least one actuator 72 to move the shutters 42 for each opening 30. The actuator 72 is of an electric type and adapted to be connected to a source of power (not shown). The actuator 72 has a splined receiving cavity 74 on each side to receive a splined end 76 on the second shaft 46 on one of the shutters 42 for each opening 30. As illustrated, one splined receiving cavity 74 is disposed at a top end on each side of the actuator 72 and receives the splined end 76 on the second shaft 46 of the top one of the shutters 42 for each opening 30. The actuator 72 is disposed in a cavity 78 formed between the interior walls 28 and a front wall 80 of the frame 20. The actuator 72 is secured to the front wall 80 of the frame 20 by a suitable mechanism such as a fastener 82. It should be appreciated that the front wall 80 protects the actuator 72 from debris. It should also be appreciated that the actuator 72 may be connected to an electronic controller (not shown) to receive signals to move the shutters 42 in response to a sensed condition for opening or closing the shutters 42 to allow or prevent airflow to the radiator 14 of the vehicle 12.

In operation of the active grille shutter assembly 10, the active grille shutter assembly 10 is attached to the vehicle 12. When the vehicle 12 is being driven, airflow impinges upon the active grille shutter assembly 10. The actuator 72 is signaled to actuate by an electronic controller (not shown) in the vehicle 12 to rotate the splined receiving cavities 74, in turn, rotating the splined end 76 of the second shaft 46 of the top or drive shutter 42. Since the top shutter 42 is interconnected to the other shutters 42 via the linkage 68, the other shutters 42 move together in tandem as a unit with the top shutter 42. The shutters 42 may be moved to a fully closed position, fully open position, or one of multiple positions therebetween.

The present invention has been described in an illustrative manner. It is to be understood that the terminology which has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. An active grille shutter assembly for a vehicle comprising:
a frame adapted to be disposed in front of a radiator of a vehicle and connected to a portion of a vehicle, said frame includes a top wall, a bottom wall, a plurality of side walls extending between said top wall and said bottom wall, a plurality of interior walls extending between said top wall and said bottom wall and spaced laterally from said side walls and from each other to form at least one opening to allow air to pass therethrough, with a plurality of interior wall apertures extending through each of said interior walls;
a plurality of bearing end caps, each of said bearing end caps including a base wall with a plurality of end cap apertures extending through said base wall;
an actuator operatively supported by said frame;
at least one linkage disposed adjacent to said actuator in said opening, said linkage having a plurality of linkage apertures; and
a plurality of shutters disposed in and extending across said opening and between said bearing end caps mounted to said opposed side walls, each of said shutters including a first shaft and a second shaft that define an axis about which said shutters rotate with said first shaft of each of said shutters rotatably supported in one of said end cap apertures of said bearing end caps and with said second shaft of each of said shutters rotatably supported in one of said interior wall apertures of said frame, and each of said shutters further including a projection extending axially in spaced parallel relationship with respect to said axis defined by said first shaft and said second shaft, said actuator operatively driving at least one second shaft of at least one shutter in said opening, said projection on each of said shutters operatively received in a corresponding linkage aperture of said linkage, such that rotation of at least one shutter extending across said opening imparts rotational movement to each of the other shutters in said opening through said linkage.

2. An active grille shutter assembly as set forth in claim 1 including at least one projection extending outwardly from said top wall and said bottom wall and adapted for connection to the portion of the vehicle.

3. An active grille shutter assembly as set forth in claim 1 wherein said frame is made of a plastic material.

* * * * *